United States Patent [19]

Sumi et al.

[11] 4,159,168

[45] Jun. 26, 1979

[54] EXPOSURE CORRECTION FACTOR SETTING DEVICE FOR A CAMERA

[75] Inventors: Akiyasu Sumi, Kawasaki; Tokuichi Tsunekawa; Shohei Ohtaki, both of Yokohama, all of Japan

[73] Assignee: Canon Kabushiki Kaisha, Tokyo, Japan

[21] Appl. No.: 855,480

[22] Filed: Nov. 29, 1977

[30] Foreign Application Priority Data

Dec. 7, 1976 [JP] Japan .................................. 51-146895

[51] Int. Cl.$^2$ ......................... G03B 7/00; G03B 15/05
[52] U.S. Cl. ........................................ 354/21; 354/37; 354/48; 354/32; 354/149; 354/58
[58] Field of Search ................... 354/21, 28, 37, 41, 354/48, 49, 60 R, 289, 58, 354, 202, 32, 149; 352/141, 78 C

[56] References Cited

U.S. PATENT DOCUMENTS

| | | | |
|---|---|---|---|
| 3,094,051 | 6/1963 | Hutchison, Jr. et al. | 354/28 |
| 3,266,395 | 8/1966 | Kremp et al. | 354/21 |
| 3,303,765 | 2/1967 | Jakob et al. | 354/58 |
| 3,388,648 | 6/1968 | Thiele et al. | 354/21 |
| 3,524,392 | 8/1970 | Langnau et al. | 354/21 |
| 3,947,862 | 3/1976 | Watanabe et al. | 354/289 |
| 3,956,763 | 5/1976 | Yamanaka | 354/289 |
| 4,067,033 | 1/1978 | Urano et al. | 354/289 |

Primary Examiner—L. T. Hix
Assistant Examiner—William B. Perkey
Attorney, Agent, or Firm—Toren, McGeady and Stanger

[57] ABSTRACT

An exposure correction factor setting device is disclosed which includes an exposure correction factor setting dial, a brush connected to the dial and arranged to be operated when the film speed is manually adjusted, and a bias device connected to a variable resistor for manual adjustment of the film speed so as to apply to a film speed signal producing device for automatic adjustment of film speed a bias signal corresponding to the exposure correction factor set by the dial. It is thereby possible to utilize the exposure correction factor setting device in automatically setting a film speed by a film cassette as well as in manually setting the film speed.

7 Claims, 4 Drawing Figures

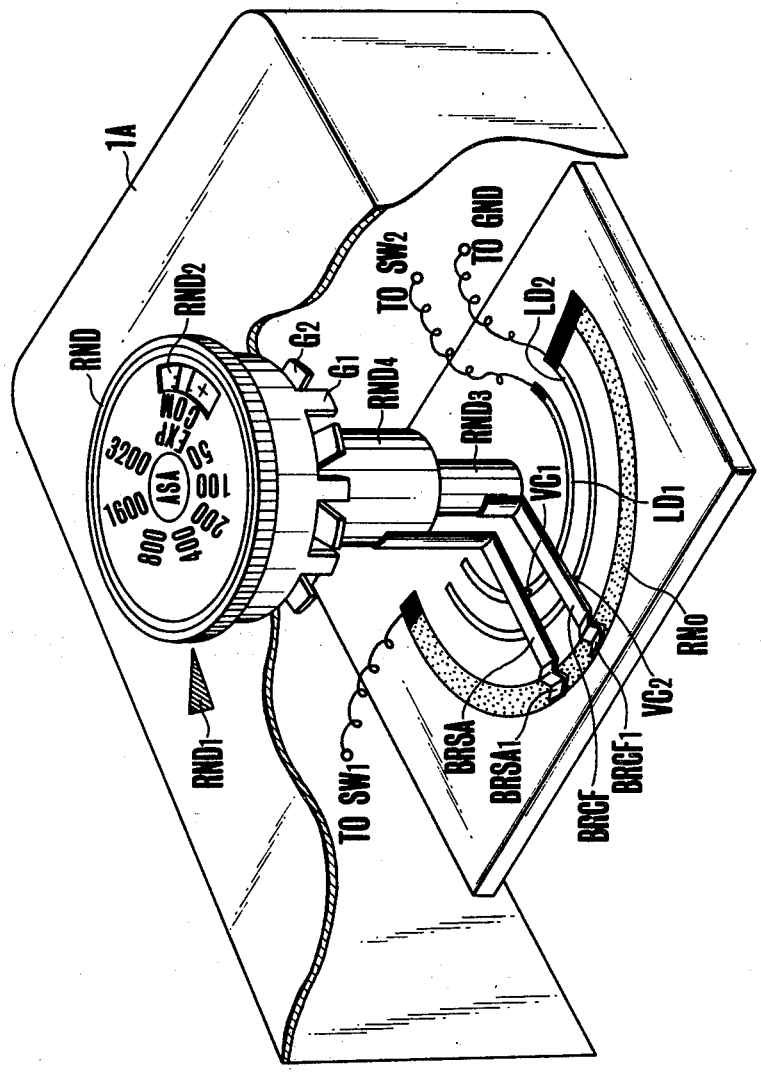
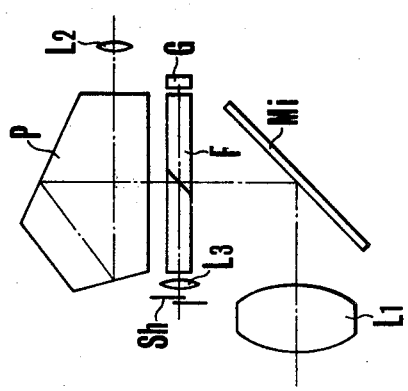
FIG.3
FIG.2

EXPOSURE CORRECTION FACTOR SETTING DEVICE FOR A CAMERA

BACKGROUND OF THE INVENTION

1. Field of the Invention

This invention relates to photographic cameras with a light measuring circuit adapted to adjust exposure control and operating with a manually operable or automatic film speed setting mechanism, and more particularly to an exposure correction factor setting device associated with such mechanism.

2. Description of the Prior Art

In general purpose photography, the exposure of a photo-sensitive material or film is controlled in accordance with scene brightness. In some photographic situations, as, for example, using flash illumination, however, it is required to modify a photoelectrically derived exposure value by taking into account the reflective characteristics of the environment surrounding an object of principal photographic interest the modification being defined as a correction factor.

It is known to provide an exposure correction factor setting device utilizing a common variable resistor in a film speed dial. With this device, after the given film speed has been set in this resistor, the thus set value of resistance is changed by +1 or −1 in EV to effect either an under-exposure with a decrease of 1 EV from the basic exposure value, or an over-exposure with an increase of 1 EV therefrom. Recently, a manually operable or automatic film speed setting mechanism has been developed, and there is strong demand for imparting into such mechanism the function of the exposure correction factor setting device.

SUMMARY OF THE INVENTION

An object of the present invention is to provide a photographic camera having an automatic exposure control system responsive to scene brightness for deriving either a daylight or a flash exposure value which can be modified by a correction factor through a manually operable or automatic film speed setting mechanism.

Another object is to provide an exposure correction factor setting device associated with the film speed setting mechanism of the type described and capable of setting a reliable and accurate correction factor even when the mechanism is rendered automatic regardless of whether or not the manually accessible operating member for the mechanism, e.g., the film speed dial movably mounted on the camera housing, is set in a position for the given film speed.

Still another object is to provide an exposure correction factor setting device of simple structure.

Still another object of the present invention is to provide an exposure correction factor setting device which can be utilized both for the automatic setting and the manual setting of the film speed.

These and other objects of the present invention will become apparent from the following detailed description taken in conjunction with the accompanying drawings in which:

BRIEF DESCRIPTION OF THE DRAWINGS

FIG. 2 is a sectional view of a finder optical system with a photo-sensitive element of FIG. 1.

FIG. 3 is a perspective view showing an example of the construction and arrangement of an exposure correction factor setting device of the present invention.

DESCRIPTION OF THE PREFERRED EMBODIMENT

Figure 1:
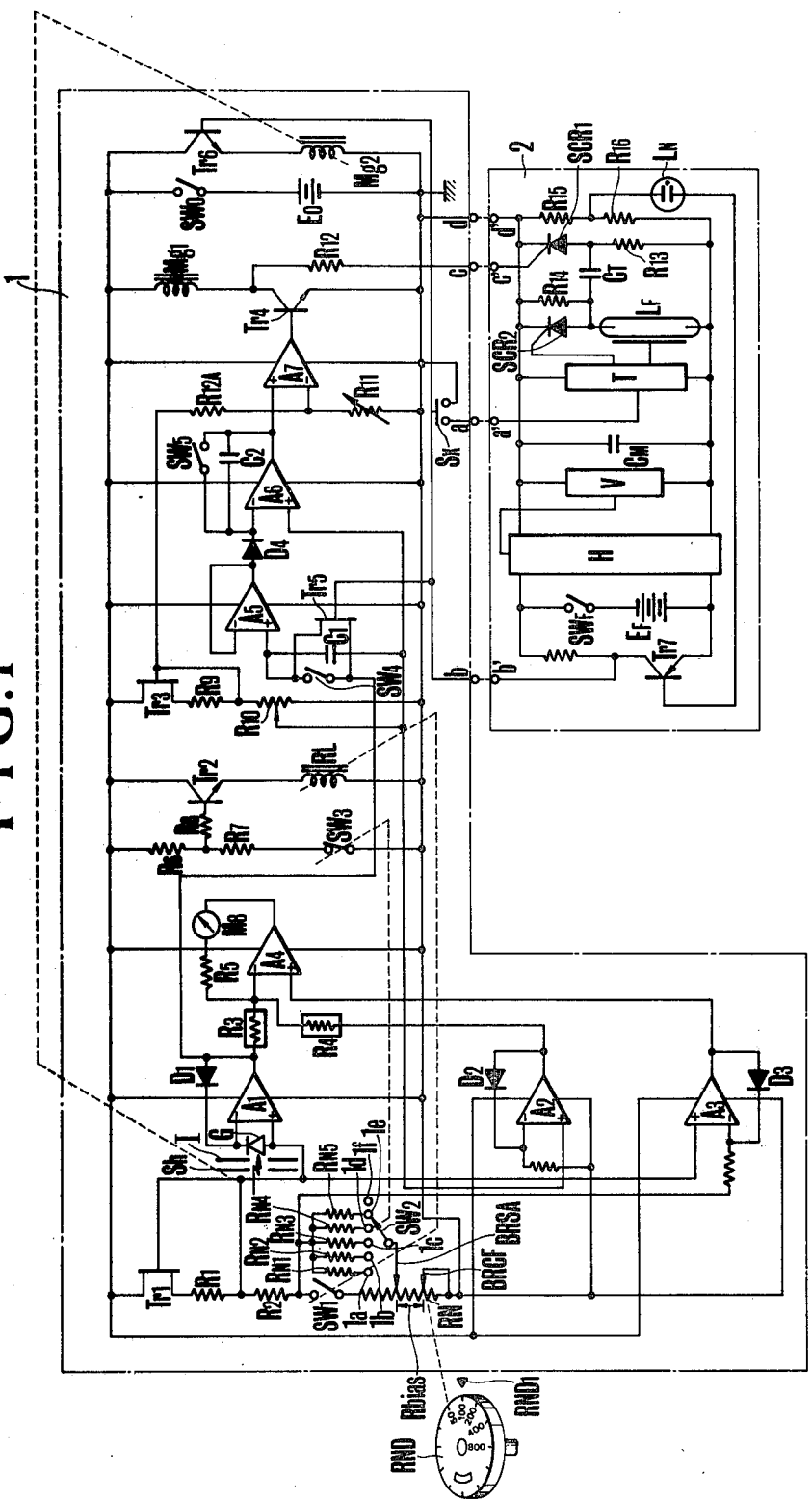
FIG. 1 is a schematic electrical circuit diagram of an example of an automatic exposure control system for daylight and flash photography embodying one form of an exposure correction factor setting device of the present invention.

Referring to FIGS. 1 and 3, there is shown one embodiment of an exposure correction factor setting device according to the present invention applied to an automatic exposure control system of the type in which daylight and flash exposure values are selectively derivable by a common light measuring circuit. The system consists of two sections enclosed within dot-and-dash line blocks 1 and 2 incorporated in a single lens reflex camera and an electronic flash device respectively. The camera 1 and flash device 2 are electrically connected when the flash device 2 is attached to the camera 1 with an adapter which has an array of four interconnection terminals, a' to d', inserted into and seated in an accessory shoe having an array of interconnection terminals, a to d.

The circuitry of the camera 1 is adapted to operate in a diaphragm priority automatic exposure range and includes a photo-sensitive element such as a silicon photo-diode G positioned to receive light from a scene being photographed either through an opening of a lens aperture mechanism I or through a diaphragm shutter Sh, an operational amplifier A1 having inverting and non-inverting input terminals across which the silicon photo-diode G is connected, and a diode D1 of logarithmic compression characteristics connected in the feedback network of the operational amplifier A1. The output of the operational amplifier A1 is connected both to an exposure value (i.e. exposure time) display control circuit through a temperature sensitive resistor R3 and to a memory capacitor C1 through a control switch SW4 which is arranged to be opened after a shutter release button is depressed but before the reflex mirror is moved upward.

The display control circuit comprises an operational amplifier A4 having a non-inverting input terminal connected to the temperature sensitive resistor R3, and having an output terminal connected to an input of a moving coil instrument M8 having a needle positioned in the field of view of a finder and cooperative with a shutter speed scale (not shown). Connected to the inverting input of the operational amplifier A4 is one end of a temperature sensitive resistor R4, the opposite end of which is connected to an output terminal of an operational amplifier A2 with a diode D2 connected in the feedback network thereof. The non-inverting input of the operational amplifier A4 is connected to an output of an operational amplifier A3 with a diode D3 connected in the feedback network thereof.

The memory capacitor C1 is connected through a buffer amplifier A5 and an expansion diode D4 to an integrator which comprises an operational amplifier A6 and a timing capacitor C2 connected in the feedback network between the non-inverting input and output of the operational amplifier A6. Connected across the capacitor C2 is a start switch SW5 which is arranged to be opened when a front shutter curtain (not shown) starts to run down. When the output voltage of the integrator detected by a comparator A7 has reached a critical voltage level pre-adjusted by the combination of a voltage divider R11 and R12A and a constant current circuit which comprises a field effect transistor Tr3 and resistors R9 and R10, a switching transistor is rendered non-conducting to de-energize an electromagnet Mg1 controlling the operation of a rear shutter curtain and also actuating a SCR1 controlling the operation of a firing circuit of the flash device 2.

The circuitry of the flash device 2 is of the series-controlled type in which the time interval of energization of a flash tube LF is controlled by making use of the common photosensitive element G and common integrator A6 and C2 of the camera 1. The firing circuit for the flash tube LF includes an electrical power source or battery EF connected through a main switch SWF and through a voltage booster to charge a storage capacitor CM to a voltage level preadjusted by a saturation voltage control circuit V. The tube LF is connected across the storage capacitor CM through a firing control element or SCR2. The gating control input of SCR2 is connected to a trigger circuit T at one output terminal, and another output terminal which is connected to the trigger electrode of the tube LF. To terminate the duration of energization of the tube LF at a time of closing of the shutter, there is provided a commutation capacitor CT connected across the firing control SCR2 through the above-noted SCR1. Resistors R13 and R14 constitute a charging circuit for the commutation capacitor CT.

In order to automatically switch the camera 1 from the daylight to the flash mode in response to the attainment of the voltage of the storage capacitor CM to the normal firing level, there is provided a circuit which includes a resistor voltage divider R15 and R16 connected across the storage capacitor CM, a neon tube LN connected at one pole to the junction between resistors R15 and R16, the opposite pole being connected to the base of a transistor Tr7. The collector of transistor Tr7 is connected to the interconnection terminal, b', upon contact with the interconnection terminal b', of the camera 1, to control both of a field effect transistor Tr5 and a transistor Tr6. The transistor Tr5 is connected across the exposure value memory switch SW4 so that even when the switch SW4 is opened as the mirror Mi (see FIG. 2) is moved upward, the output of the light measuring circuit continues to be applied to the integrator circuit. As the light entering through the objective lens of the camera 1 is blocked from reaching the photo-sensitive element G by the mirror Mi set in the non-viewing position, another path of light coming from the object and reaching the photo-sensitive element G is established by opening the sensor shutter Sh whose operation is controlled by an electromagnet Mg2 connected to the transistor Tr6.

FIG. 2 shows an example of arrangement of the sensor shutter Sh as cooperating with the photo-sensitive element G in a finder housing. The finder optical system comprises the common objective lens L1 of the camera 1, the quick return mirror Mi, a focusing screen F provided on the lower surface of a thick glass plate, a pentaprism P and an eye-piece L2. The photo-sensitive element G is positioned adjacent the rear side of the glass plate F to receive light entering through the objective lens L1 after successive reflections from the mirror Mi set in the viewing position and a half mirror formed in the glass plate. Positioned adjacent the front side of the glass plate F and behind a window (not shown) formed in the front panel of the finder housing are the sensor shutter Sh and a collective lens L3 in alignment with each other and with the photo-sensitive element G.

Referring again to FIG. 1, the camera 1 further includes a manually operable or automatic film speed setting circuit comprising a constant current circuit of a field effect transistor Tr1 and a fixed resistor R1 cooperative with the operational amplifier A3, a fixed resistor R2, a variable resistor RN connected through a manual-to-automatic responsive switch SW1 and the fixed resistor R2 connected through the constant current circuit Tr1 and R1 and having a first sliding brush BRCF mechanically associated with a film speed dial RND which also serves to set a desired exposure correction factor value as will be described later, and an array of five fixed resistors RN1 to RN5 of different resistance all connected at one end by way of a common lead to the constant current circuit through the resistor R2, and connected at the opposite ends to respective fixed contacts 1a to 1e of a switch SW2. This switch SW2 though shown as having a movable contact is established when an automatic film speed setting type cassette (hereinafter referred to as auto-film cassette) having a marker representative of the speed of film therein is inserted into and seated in the cassette chamber of the camera 1 so that the marker serves as the pole of the switch SW2. When a manual film speed setting type cassette (hereinafter referred to as manual-film cassete) having no marker is used, the marker responsive switch SW2 is set to a position designated "1f" where a switch SW3 is opened to cut off a voltage divider of resistors R6 and R7 from a battery Eo. Connected to a junction between the resistors R6 and R7 through a resistor R8 is a base of a transistor Tr2 controlling the operation of a relay RL associated with the switch SW1.

According to one of the features of the present invention, the variable resistor RN is provided with a second sliding brush BRSA connected to the pole of the switch SW2 so as to apply a bias voltage for exposure correction to the automatic film speed setting circuit RN1 to RN5, when the auto-film cassette is already inserted in the camera 1. Other features of the invention will become apparent from the following description by reference to FIG. 3.

In FIG. 3, the aforementioned film speed dial RND has a number of numeral indicia from 50 to 3200 in ASA cut on the upper surface thereof and arranged to cooperate with a stationary index mark RND1 on the top panel of the camera housing 1A and is fixedly connected to a shaft RND3 which extends through the hole of a sleeve RND4 in slidingly movable relation to a point slightly above a substrate of electrically insulating material. Fixedly mounted on this substrate are a semicircular resistance track RN0 of uniform density over the entire length thereof concentric to the axis of the shaft RND3 and two semi-circular conductive tracks LD2 and LD1 of successively smaller radii in this order from that of the resistance track RN0 concentric to each other and to the resistance track RN0. The aforementioned first brush BRCF is constructed in the form of a conductive arm radially extending from the bottom end of the dial shaft RND3 to terminate at a bent-off portion BRCF1 arranged to slidingly ride on the resistance track RN0 when the film speed dial RND is set in the illustrated downmost position where a hump VC2 of the brush BRCF also is in contact with the second conductive track LD2.

The sleeve RND4 is rotatably mounted on the camera housing 1A and the shaft RND3 has an annular flange whose upper surface carries exposure correction factor indicia, namely, +1 F, 0, and −1 F, the only first one being shown to be visible through a window RND2 provided through the wall of the dial RND as the photographer was intended to select this value. If he or she is intended to set any one of the other values, the film speed dial RND will first be pulled upward until a number of coupling lugs G1 downwardly extending from a ring of the dial RND and equally spaced from each other are disengaged from respective detent slots formed between successive projections G2 of the flange of the sleeve RND4, and then turned in a counterclockwise direction to place a desired value in registry with the symbol EXP1COM. After that, his or her fingers may be removed from the dial RND to effect automatic coupling of the lugs G1 with the detent slots G2. The aformentioned second brush BRSA is constructed in the form of an electrically conductive arm fixedly carried on the sleeve RND4 and having a bent-off portion always maintained in contact with the resistance track RN0 and a hump VC1 slidingly movable on the conductive track LD1. One end of the conductive track LD1 is connected by a wire to the switch SW2. The parts RND, RND2, G1, G2, RND4, RND3, BRSA, BRSA1, BRCF, BRCF1, VC1, VC2, RN0, LD1 and LD2 constitute the exposure correction factor setting device of the present invention. During the manual exposure correction factor setting operation, the second brush BRSA remains stationary so that when the film speed dial RND is turned while being lifted up to the uppermost position, the distance between the sliding points BRCF1 and BRSA1 is varied depending upon the value of correction factor selected at the window RND2. On the other hand, when the film speed dial RND is turned while being engaged with the sleeve RND4 through the coupling between the lugs G1 and slots G2, the once adjusted distance between the sliding contacts BRCF1 and BRSA1 is maintained constant so that when the auto-film cassette is used, the selected correction factor is introduced into the light measuring circuit independently of what position the film speed takes in reference to the index RND1, as the film speed and exposure correction factor setting circuit is connected in series to the photo-sensitive element G.

The operation of the system of FIGS. 1 to 3 is as follows: When a daylight exposure is to be made by the use of an auto-film cassette, the photographer will first manipulate the film speed dial to set a desired exposure correction factor usually at zero, and then insert the film cassette into the chamber therefor, so that one of the five resistors RN1 to RN5 which depends upon the given film speed is automatically selected by the marker responsive switch SW2 to be connected with the operational amplifier A1, while the variable resistor RN is cut off by the opened switch SW1 from the operational amplifier A1, provided that a power switch SW0 was closed. The loading of the auto-film cassette also causes the switch SW3 to be closed so that the closure of the power switch SW0 does not result in energization of the coil of the relay RL and therefore the switch SW1 is maintained open at the time of closure of power switch SW0. Although the variable resistor RN lacks the function of setting any film speed value, it serves to provide for a bias resistor R(bias) of the automatic film speed setting circuit as will be seen from FIG. 1. Responsive to light the level of brightness (Bv) of an object to be photographed and the size of diaphragm aperture (Av), the photosensitive element G produces an output voltage representative of (Bv−Av) which is then combined with information representative of the film speed (Sv) by the operational amplifier A1 to derive an exposure time (Tv) based on the formula $Tv=(Bv-Av)+Sv$. The output of the operational amplifier A1 after being compensated for temperature variation by the circuit including operational amplifiers A2 and A3 is applied both to the display circuit including the exposure value meter $M_8$ and to the memory capacitor C1.

When the shutter release button is depressed, the memory control switch SW4 is opened and is soon after followed by an upward movement of the mirror Mi. The input impedance of the buffer amplifier A5 is so high that the voltage stored on the memory capacitor varies to an acceptably small extent during the exposure. At the initiation of the running down movement of the front curtain (not shown), the start switch SW5 of the timing capacitor C2 is opened. In a time interval dependent upon the output of the expansion circuit A6 and D4, the comparator A7 produces an output signal which is applied to the base of transistor Tr4, thereby turning off the transistor Tr4 to de-energize the electromagnet Mg1. As the rear curtain (not shown) was latched by the energized electromagnet Mg1 in the cocked position, the de-energization of the electromagnet Mg1 causes the termination of duration of the time interval or the computed exposure time, thereby providing a correct daylight exposure provided the set value of exposure correction factor is zero.

With a manual-film cart cassette loaded in the camera 1, as the switch SW2 is set to "1f" position where no resistor RN1–RN5 is selected and the switch SW3 is open, when the power switch SW0 is closed, the transistor Tr2 is turned on to energize the coil of the relay RL, causing the manually operated film speed setting circuit to be established by the closed switch SW1. This circuit can be traced from the inverting input of operational amplifier A1 through the resistor R2, closed switch SW1, resistance track RN0 (see FIG. 3), sliding arm or brush BRCF and conductive track LD2 to the circuit ground. Thus, a voltage proportional to the set value of film speed is applied to the operational amplifier A1.

If the photographer desires to set a significant value of exposure correction factor, he or she need first to lift up the film speed dial and maintain it in the lifted position while turning it in either of the clockwise and counterclockwise directions depending upon the signal (+) and (−) of the correction factor values respectively. As the dial RND is turned clockwise or counterclockwise, the resistance value of the variable resistor RN is decreased or increased to effect over- or under-exposure respectively.

In the flash mode, after the electronic flash device 2 has been attached to the camera 1 with the interconnection terminals, a' to d' of the device 2 being in electrical contact with the respective interconnection terminals, a to d, of the camera 1, when both of the power switches SW0 and SWF are closed to render operative the circuits in blocks 1 and 2, the storage capacitor CM of the electronic flash device starts to be charged. In a predetermined time interval, the voltage on the storage capacitor CM reaches the normal firing level for the flash tube LF. After that, the photographer will depress the shutter release button of the camera 1 with simultaneous occurrence of closure of the synchro-switch X which actuates the trigger circuit T for the flash tube LF and the thyristor SCR2 connected in series to the flash tube LF. Light reflected from a scene being photographed with flash illumination from the energized flash tube LF entering at the opened sensor shutter Sh and and being collected by the lens L3, reaching the photo-sensitive element G. At this time, therefore, the light measuring circuit of the camera 1 is operated in an overall field of view measuring mode.

Now assuming that the scene being photographed includes a high-reflectivity or high-brightness environment of a subject of principal interest, for example, an open window near the subject, then the overall field of view measuring will result in underexposure for that subject. In order to achieve derivation of correct flash lighting of the subject from the electronic flash device, it is required that a positive value of exposure correction factor, must be set prior to making an exposure. If his or her preliminary evaluation of the subject lighting is +1 [EV] above the recommended exposure value, the film speed dial RND is lifted up to disengage the coupling lugs G1 from the detent slots G2 and then turned clockwise while being maintained in the lifted position to place an indicium "+1F" in alignment with the window RND2, as shown in FIG. 3. During this exposure correction factor setting operation, the bias brush BRSA remains stationary so that the voltage appearing across the manually operated or automatic film speed setting circuit is decreased by a magnitude corresponding to one film speed-step from that occurring when no correction factor is set. Accordingly, the voltage stored on the memory capacitor C1 is made lower by a magnitude corresponding to one shutter speed step so that the exposure time is elongated by one step, while nevertheless deriving a correct flash exposure for the subject of principal interest.

As the timing capacitor C2 is charged during the time interval dependent upon the voltage appearing at the capacitor C1, taking a voltage incident with the reference voltage preadjusted by the variable resistor R11 at the termination of duration of that interval, the transistor Tr4 is turned off to produce a deactuating signal which is applied through terminals C-and-C' connected to the gating control input of the thyristor SCR1 of the flash device 2. Such conduction of SCR1 causes nonconduction of the thyristor SCR2, resulting in the termination of energization of the flash tube LF at the same time as that at which the shutter is closed. The foregoing operation proceeds independently of what type of film cassette is loaded in the camera.

Figure 4:
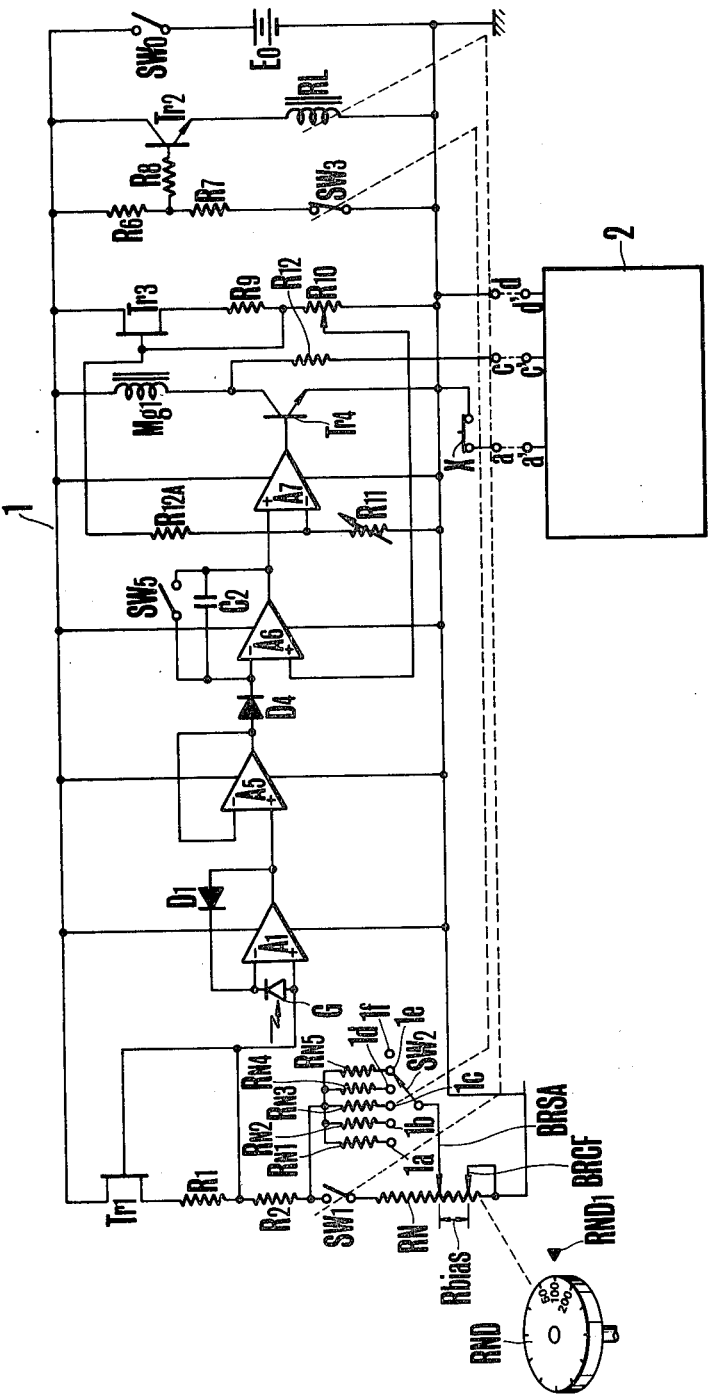
FIG. 4 is a schematic electrical circuit diagram of another example of the automatic exposure control system.

FIG. 4 shows another example of the automatic exposure control circuit different from the example of FIG. 1 in that the photosensitive element G is positioned to receive light reflected from the focal plane within the camera after the mirror has been moved to the non-viewing position, while the memory means, flash light measuring means and control means therefor are omitted to simplify the structure of the circuit. In this case, the light measuring circuit of the camera is limited to the overall field of view light measuring mode in daylight as well as flash photography. For this reason, the exposure correction factor setting device of the invention will be advantageously operated to effect a correct exposure even in the daylight mode by taking into account the above-noted environmental influences.

It will be seen from the foregoing that the present invention provides an exposure correction factor setting device of simple structure in association with a film speed setting device which may be of the type in which the given film speed is set either by hand or automatically. Accordingly, the device of the invention is compatible with the camera structure of small size and light weight. Another advantage is that the correction factor is introduced in the form of a corresponding length of that portion of the resistance track which is defined by the first and second brushes and which is not affected by the manually set value of film speed and therefore that when the film speed setting operation changes from the manual mode to the automatic mode with simultaneous change in film speed, there is no need to manipulate the film speed dial for the purpose of setting the correction factor provided that the once adjusted value of correction factor is used again.

Instead of arranging the bias brush BRSA to move on the resistance track RN0 in connection with the film speed dial RND, it is possible to fixedly mount the bias brush BRSA relative to the resistance track, though the last named advantage is lost.

What is claimed is:

1. An exposure correction factor setting device for a camera utilizing film and having a first film speed signal producing means for producing a first signal in accordance with a film speed set automatically in response to indicia on said film, and including a second film speed signal producing means for producing a second signal in accordance with a film speed set manually, and an exposure correction factor adjusting means for adjusting the output signal of said second film speed signal producing means in response to a manually selected exposure correction factor, the improvment comprising: bias means connected between said first and second film speed signal producing means for supplying to said first film speed signal producing means a bias signal corresponding to a signal which is produced on said second film speed signal producing means by adjustment of said exposure correction factor adjusting means when said film with said indicia is inserted into the camera.

2. An exposure correction factor setting device according to claim 1, wherein said adjusting means and said bias means are arranged to move on said second film speed signal producing means while maintaining a constant separation therebetween when the film speed is adjusted.

3. An exposure correction factor setting device according to claim 2, wherein said adjusting means and said bias means are associated with a film speed dial mounted on the camera.

4. An exposure correction factor setting device according to claim 1, wherein said second film speed signal producing means includes:
 (a) a resistor; and
 (b) film speed adjusting means associated with the film speed dial for varying the resistance value of said resistor in response to the value of film speed set by the film speed dial.

5. An exposure correction factor setting device according to claim 4, wherein said film speed adjusting means and said exposure correction factor adjusting means slide on the same resistor.

6. An exposure correction factor setting device according to claim 5, wherein said film speed adjusting means includes a brush contacting with said resistor in order to vary the resistance value of said resistor.

7. An exposure correction factor setting device according to claim 4, wherein said exposure correction factor adjusting means includes a brush associated with an exposure correction factor dial of the camera.

* * * * *